(12) United States Patent
Epshteyn et al.

(10) Patent No.: US 10,510,458 B2
(45) Date of Patent: Dec. 17, 2019

(54) LITHIATED CARBON PHOSPHONITRIDE EXTENDED SOLIDS

(71) Applicant: The Government of the United States of America, as represented by the Secretary of the Navy, Arlington, VA (US)

(72) Inventors: Albert Epshteyn, College Park, MD (US); Andrew P. Purdy, Alexandria, VA (US); Brian L. Chaloux, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/282,600

(22) Filed: Feb. 22, 2019

(65) Prior Publication Data

US 2019/0189303 A1  Jun. 20, 2019

Related U.S. Application Data

(62) Division of application No. 15/630,427, filed on Jun. 22, 2017, now Pat. No. 10,249,403.

(60) Provisional application No. 62/353,408, filed on Jun. 22, 2016.

(51) Int. Cl.
  *H01M 8/103* (2016.01)
  *H01B 1/12* (2006.01)
  *H01M 4/60* (2006.01)
  *H01M 4/90* (2006.01)
  *C01B 21/097* (2006.01)

(52) U.S. Cl.
  CPC ........... *H01B 1/122* (2013.01); *C01B 21/097* (2013.01); *H01M 4/602* (2013.01); *H01M 4/90* (2013.01); *H01M 8/103* (2013.01)

(58) Field of Classification Search
  CPC ....... H01B 1/122; C01B 21/097; H01M 8/103
  See application file for complete search history.

(56) References Cited

U.S. PATENT DOCUMENTS 5,411,592 A * 5/1995 Ovshinsky ............ C23C 14/562
                                                                 118/718

OTHER PUBLICATIONS

Mascaraque, N. , Durán, A. , Muñoz, F. and Tricot, G. (2016), Structural Features of LiPON Glasses Determined by 1D and 2D 31P MAS NMR. Int J Appl Glass Sci, 7: 69-79. doi:10.1111/ijag.12120.

* cited by examiner

*Primary Examiner* — Peter D. Mulcahy
(74) *Attorney, Agent, or Firm* — US Naval Research Laboratory; Roy Roberts

(57) ABSTRACT

A lithiated carbon phosphonitride material is made by, for example, reacting $P(CN)_3$ with $LiN(CN)_2$ in solution (for example, dimethoxyethane or pyridine), then drying the solution to obtain the product. The material is a thermoset that is stable to over 400° C. and exhibits up to $10^{-3}$ S·cm2 of $Li^+$ conductivity.

3 Claims, 11 Drawing Sheets

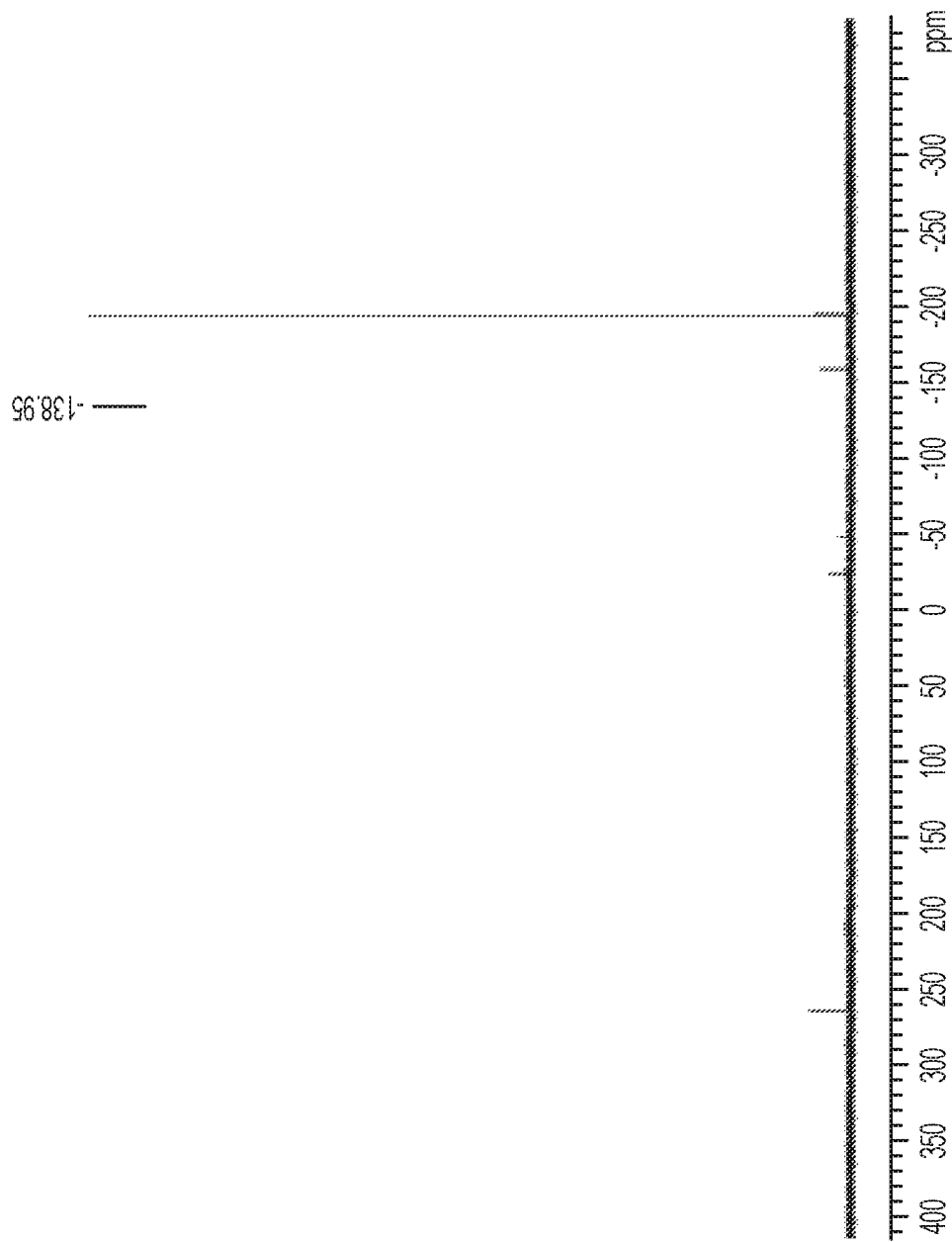

LITHIATED CARBON PHOSPHONITRIDE EXTENDED SOLIDS

CROSS-REFERENCE TO RELATED APPLICATIONS

This Application claims the benefit of U.S. Provisional Patent Application 62/353,408 filed on Jun. 22, 2016 and of U.S. patent application Ser. No. 15/630,427 filed on Jun. 22, 2017, the entirety of each of which is incorporated herein by reference.

This Application is related to U.S. Pat. No. 9,409,936, the entirety of which is incorporated herein by reference.

BACKGROUND

Phosphorus (III) cyanide, $P(CN)_3$, has been known for more than a century, but only recently discovered to be transformable into a solid carbon phosphonitride material via pressure and thermal treatment, as described in U.S. Pat. No. 9,409,936 and in "$P(CN)_3$ Precursor for Carbon Phosphonitride Extended Solids," by Brian L. Chaloux et al., *Chemistry of Materials* 2015 27 (13), 4507-4510.

A need exists for related techniques and materials.

BRIEF SUMMARY

In one embodiment, a method of making lithiated carbon phosphonitride includes reacting $P(CN)_3$ and $LiN(CN)_2$ in solution to form an initial product, then drying the product to form a lithiated carbon phosphonitride.

Another embodiment is a polymer comprising lithiated carbon phosphonitride.

It is expected that the techniques described herein can be extended using other starting materials, so that a further embodiment is a material comprising a polymer of an ionic carbon phosphonitride with univalent cations, particularly univalent cations that are alkali metals.

BRIEF DESCRIPTION OF THE DRAWINGS

FIGS. 3A, 3B, and 3C show NMR spectra of a reaction of $P(CN)_3$ with 3 $LiN(CN)_2$ in pyridine.

DETAILED DESCRIPTION

Definitions

Figure 1B:
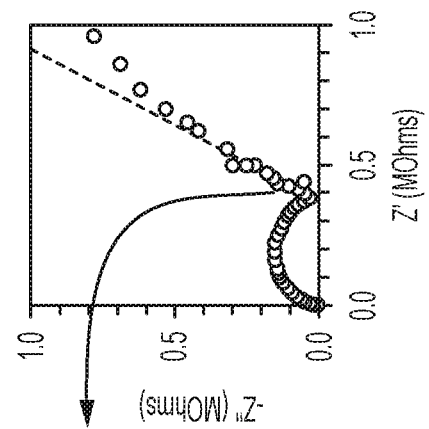
FIG. 1B shows full a impedance spectrum at 260° C. with the corresponding model fit, to illustrate goodness-of-fit.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

As described herein, phosphorus (III) cyanide ($P(CN)_3$) reacts with dicyanamides generally, and lithium dicyanamide ($LiN(CN)_2$) in particular in solution to make a dark red sol or polymeric material, with a reaction typically proceeding over the course of days. The solvent can be any mutual solvent for both reactants, e.g., dimethoxyethane (DME) or pyridine. The initial product can be dried to a smooth film by evaporation of solvent, and then converted to an insoluble inorganic film by heating above 100° C. (i.e., exhibits thermosetting), believe to be a result of crosslinking. The ability to incorporate Li and other ions into the structure opens the possibility of making completely inorganic, carbon phosphonitride based, ionic conductors and other electroactive materials.

The thermoset product has a higher degradation temperature than other known ionomeric inorganic thermosets. Furthermore, it is not believed that other polymeric or solid state cross-linked materials suitable for fuel cell membranes exhibit ionic conductivity in this moderate temperature range of 100° to 300° C., which makes this attractive for an "intermediate temperature" fuel cell applications.

Alternative technologies for fuel cell membranes suffer from various problems. For example, polymer electrolyte membranes (PEMs) are subject to poisoning and flooding involve expensive Pt catalysts, while losing protein conductivity at temperatures above 80° C. Solid oxide fuel cells (SOFCs) cannot work well below ~700° C., because solid oxide ionic conductivity also drops dramatically below these temperatures.

In addition to use in fuel cells (for example hydrogen fuel cells), this new material may be useful as an electroactive material and/or for catalysis.

EXAMPLES

Example A1

Manipulations were performed inside an argon filled dry box. To begin, 0.062 g (0.57 mmol) $P(CN)_3$ and 0.125 g (1.71 mmol) $LiN(CN)_2$ were dissolved in 3.00 g of dry dimethoxyethane. The solution started turning yellow within minutes, and was allowed to stand for 5 days. A separation of immiscible layers was observed. The top layer was poured off, leaving a dark red-brown, viscous bottom layer. Approximately 1 eq (⅓ of the total $LiN(CN)_2$) remained in the DME solution that was decanted. 1.00 g dry MeCN (acetonitrile) was added and agitated to dissolve the bottom layer. Glass slides were coated with portions of this solution in the dry box and convection dried at ambient temperature, leaving smooth, dark red films. The next day, these films were slowly heated on a hotplate to a surface temperature of 250° C., remaining smooth and becoming darker in color. It is believed that the heating caused the film to become crosslinked. The film could be separated from the glass.

Figure 1A:
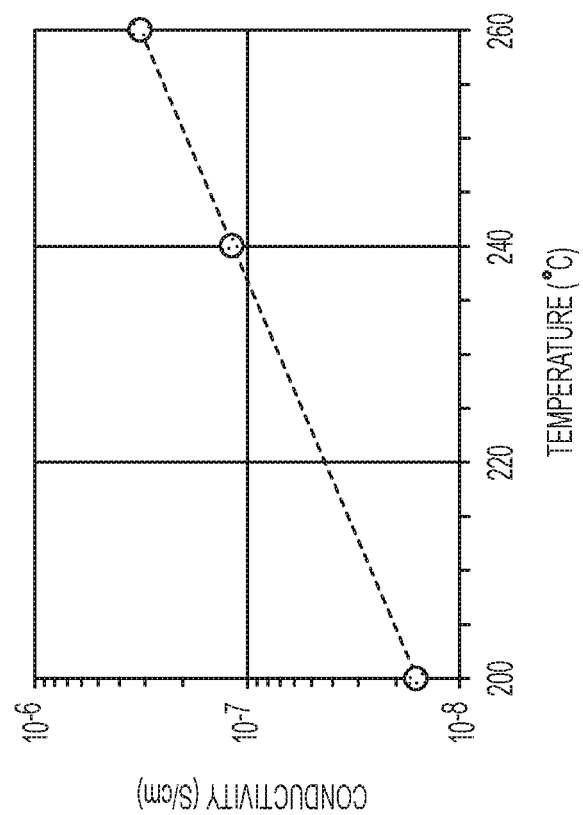
FIG. 1A shows results of impedance spectroscopy performed on a LiPCN film cast from acetonitrile.

Impedance spectroscopy performed on interdigitated gold electrodes between 1 MHz and 1 Hz was utilized to electrically characterize thick films cast from acetonitrile solution (as described above). Conductivity as a function of temperature was calculated by fitting impedance data to a modified Randles circuit model and dividing the geometric cell constant (0.12 cm$^{-1}$ for the electrodes in question) by the calculated solution resistance at each temperature. Between 200-300° C., conductivities between 10$^{-8}$ S cm$^{-1}$ and 10$^{-6}$ S cm$^{-1}$ were observed, shown in FIG. 1A. The full impedance spectrum at 260° C. with the corresponding model fit, in FIG. 1B, illustrates goodness-of-fit. Blocking behavior at low frequencies shows that conduction is ionic, not electronic, in nature.

Example A2

As described in Example A1, P(CN)$_3$ (2.00 g, 18.3 mmol) and LiN(CN)$_2$ (2.68 g, 36.7 mmol) were dissolved, this time in 5 mL dry pyridine. After 1 day the solution had become dark red-brown and viscous. Glass slides were coated with portions of this solution in an argon-filled dry box and dried first at ambient temperature, then by heating slowly to 40° C. After 5 days the solution had completely gelled, so it is preferable that it be used to form a coating within a day or two.

Figure 2:
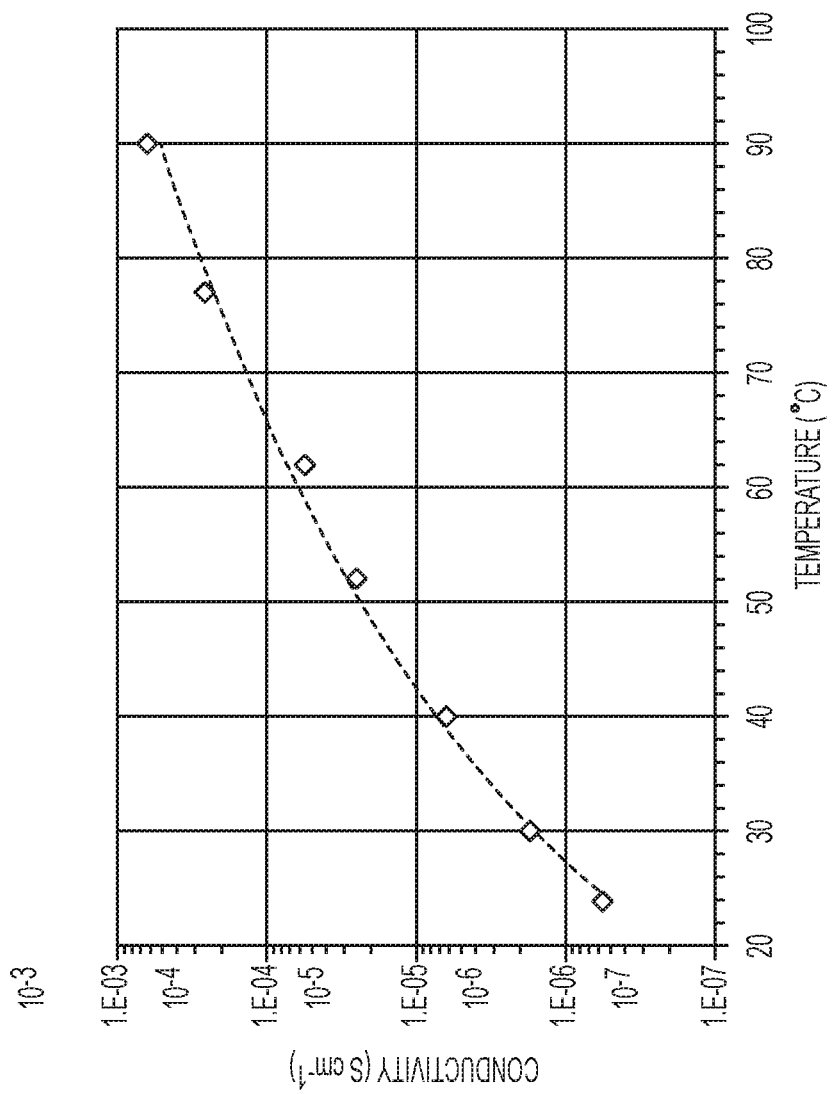
FIG. 2 shows results of impedance spectroscopy as a function of temperature for a pyridine-cast LiPCN film.

Impedance spectroscopy was performed on a gold interdigitated electrode cast in this manner, as described previously. Conductivity as a function of temperature from 20-100° C. is presented in FIG. 2. In contrast to the samples cast from MeCN, the sample cast from pyridine displayed elevated conductivities of 10$^{-6}$ S cm$^{-1}$ at room temperature (about 25° C.) up to 10$^{-3}$ S cm$^{-1}$ at 90° C. After extensive heating above 100° C., the sample degraded, preventing measurement at higher temperatures.

Example B

In an argon filled dry box, 0.3051 g (2.80 mmol) P(CN)$_3$ was dissolved in 13.3 mL anhydrous dimethoxyethane (0.210 M in P(CN)$_3$). With magnetic stirring, 0.1358 g LiN$_3$ (2.77 mmol) were slowly added to the solution, eliciting vigorous bubbling. The solution was allowed to stir for 16 hours and the supernatant decanted off the dark red, semi-solid product. Conductivity was measured as described in Example A.

Further examples follow, as the reaction was done in several different ratios. The portion of LiC$_2$N$_3$ consumed increases with the amount added as can be seen in the following table.

| Reaction number | P(CN)$_3$ (mmol) | LiN(CN)$_2$ (mmol) | LiN(CN)$_2$ remaining (mmol) |
|---|---|---|---|
| #3 | 0.596 | 1.64 | 0.512 |
| #4 | .541 | .808 | 0.100 |
| #5 | .477 | .493 | 0 |
| #6 | .917 | .015 | 0 |
| #7 | .57 | 1.71 | |
| #8 | .157 | 1.52 | |

The above reactions were all in 3.00 g DME for at least several days, then lower layer dissolved after top layer decanted. The remaining amount is that in the top layer by NMR. When bottom layer was re-dissolved in MeCN, #3 formed nice films on a glass slide. #4-6 did not. #7 is very much like #3. #6 initially did not re-dissolve, but did so over time. The #4 MeCN solution evaporated to a disk that retained the shape of the bottom of the vial, but smaller. When this object was heated to 250° C., it retained its shape and formed a disk.

Additional reactions are shown in the following table.

| Reaction number | P(CN)$_3$ (mmol) | Salt (mmol) | Solvent | Comments |
|---|---|---|---|---|
| #9 | 1.10 | 3.37 NaN(CN)$_2$ | Me$_2$NC(=O)H | Reacts rapidly, but P(CN)3 reacts slowly with the solvent |
| #10 | 1.00 | 1.12 NaN(CN)$_2$ | MeOCH$_2$CH$_2$OMe | stirred for a week to react |
| #11 | 1.00 | 1.69 Li$_2$CO$_3$ | MeOCH$_2$CH$_2$OMe | reacts very slowly |
| #12 | .514 | 0.507 KB(CN)$_4$ | MeOCH$_2$CH$_2$OMe | reacts very slowly |
| #20 | 0.10 | 0.22 LiN(CN)$_2$ | Pyridine | reacts and stays in solution until it gels |
| #21 | 0.9 | 2.7 CuN(CN)$_2$ | Pyridine | Reacted and turned to a dark solid much more quickly than with LiN(CN)$_2$ |
| #22 | 4.57 | 4.67 bmim (1-butyl-3-methylimidazolium) N(CN)$_2$ | none | Short induction period and intense exotherm leaving foamy solid |
| #23 | 1.2 | 2.5 bmim N(CN)$_2$ | none | Slowly sets up to a red-brown solid |
| #24 | 9.15 | 3.85 Ph$_3$BzP | 22 g Pyridine | Slowly sets up |

-continued

| Reaction number | P(CN)$_3$ (mmol) | Salt (mmol) | Solvent | Comments |
|---|---|---|---|---|
| | | N(CN)$_2$ + 14.5 LiN(CN)$_2$ | | to red brown solid on heating |

Figure 3B:
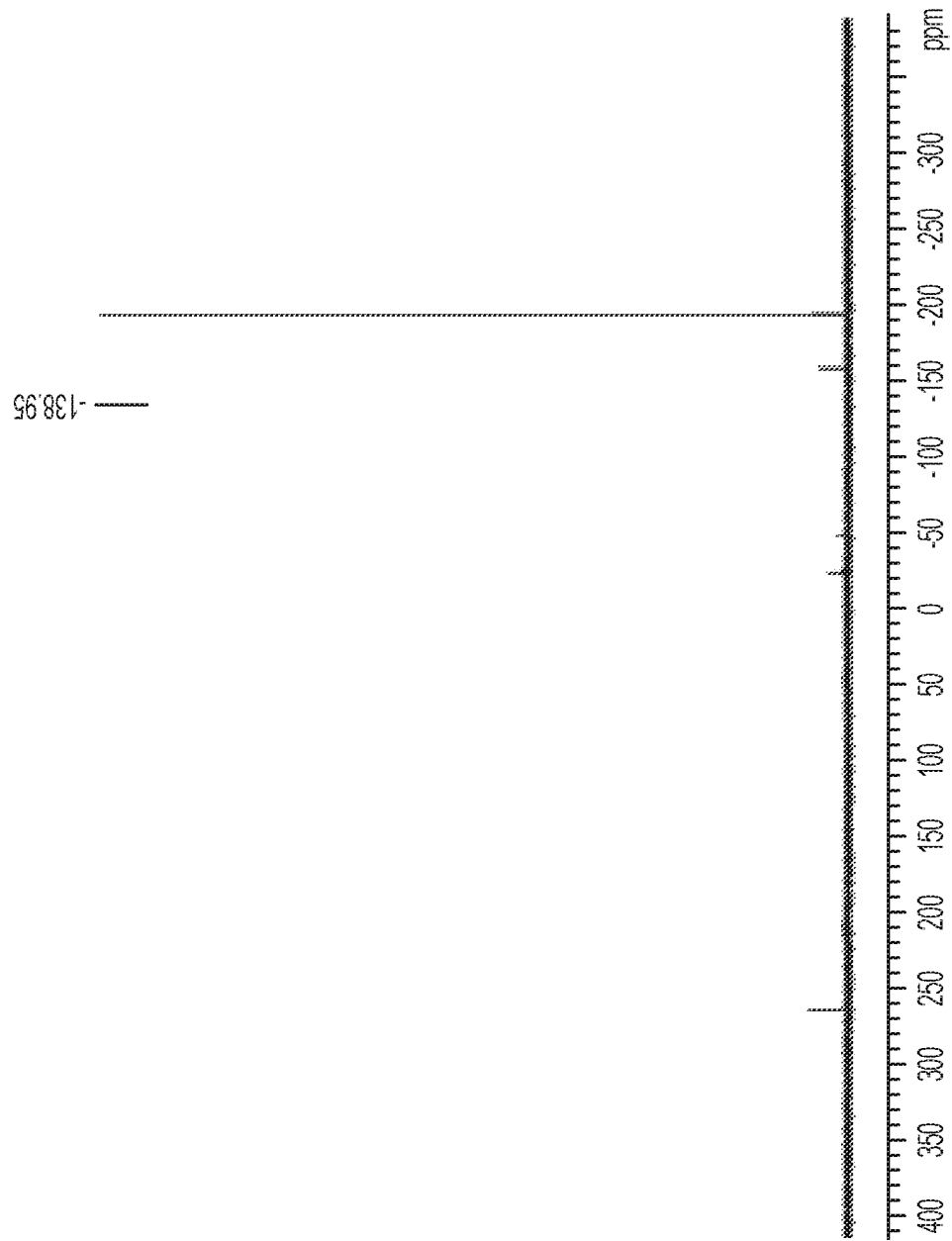
Figure 3C:
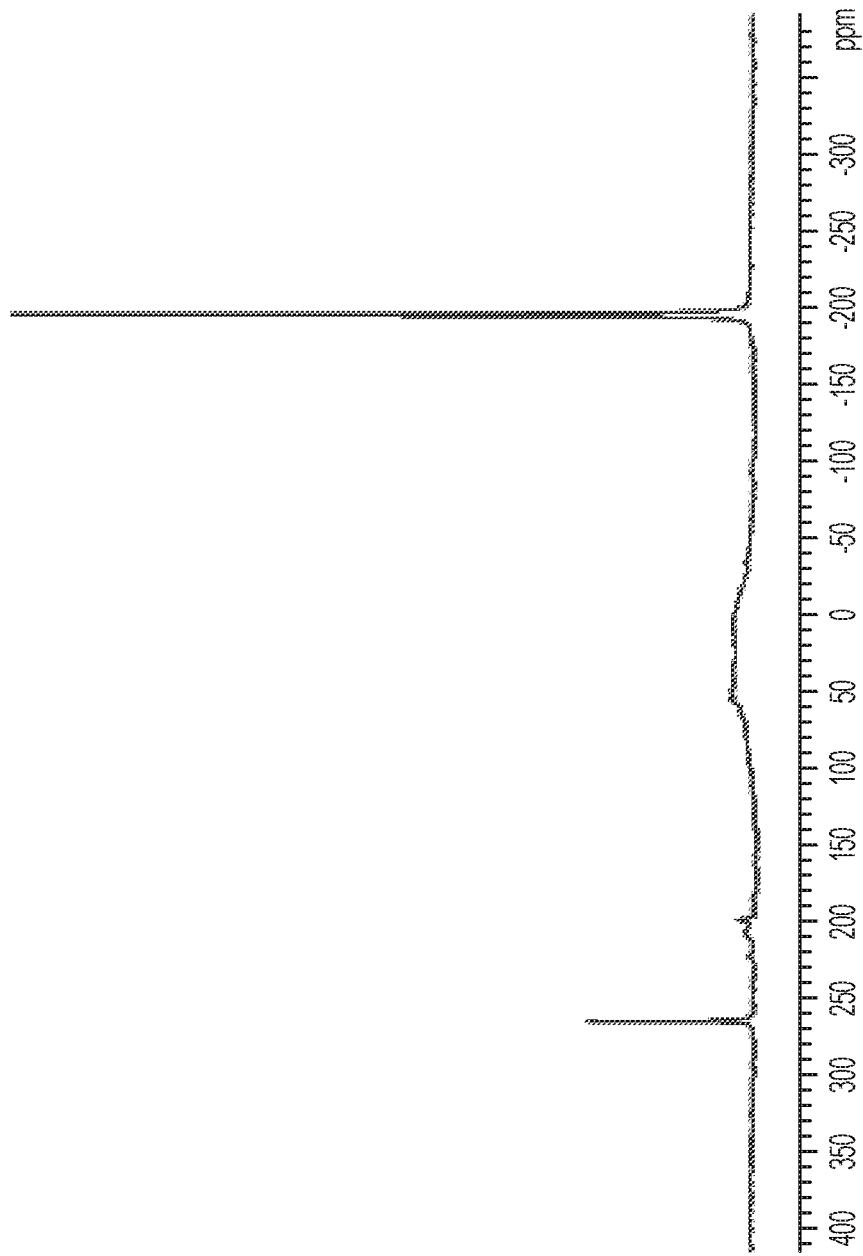

Reactions also proceeded with NaN(CN)$_2$ instead of the Li salt in DME, but is slower because the Na salt isn't very soluble in DME. Following stirring for a week, the resulting red brown viscous liquid was only partially soluble in MeCN. DMF (Me$_2$NC(=O)H) made things very soluble, but P(CN)$_3$ by itself turned color in DMF as it reacts to produce many as-yet uncharacterized side products. Both the MeCN solution from #9 and the DMF solution #10 evaporated to make poor films. After removing the MeCN solution from #10 to make a film, 1.00 g DMF was added to see if the solids would dissolve. They were partially soluble when mixed. KB(CN)$_4$ reacts very slowly and produces some light colored precipitate. LiN(CN)$_2$ reacts rapidly in pyridine and unlike the case with DME or MeCN, the polymer remains in solution (#20). Other dicyanamides also react quickly in pyridine to a dark solid, but their solubility properties differ from the Li case, even when the starting materials are fully soluble. For example, CuN(CN)$_2$ reacts to form a dark solid that precipitates from pyridine within a day. When #20 was evaporated in a dry box and heated to 100° C. 2 h and 200° C. for 16 h, it consolidated into a dark red solid piece and shrunk rather uniformly as the solvents were removed at the higher temperature. An NMR tube reaction of P(CN)$_3$ with 3 LiN(CN)$_2$ in pyridine was also done, and the P-31 spectra (FIGS. 3A-3C) show a transformation similar to that observed in glyme. The main difference is that the polymers remain in solution during the entire time. The peak around −194 ppm is P(CN)$_2$—, the broad peaks are presumed to be polymer, and the peak at 270 ppm is unidentified. An ionic liquid dicyanamide (bmim N(CN)$_2$) reacted with P(CN)$_3$ without solvent. When done on a 4.5 mmol scale, the rapid exotherm vaporized some of the reactants and left a foamy dark solid, but when done on a smaller scale, the reaction was more controlled. The reaction was also done with mixtures of dicyanamides. In particular a combination of LiN(CN)$_2$ and triphenylbenzylphosphonium dicyanamide in order to have large cations inside the material that can be extracted with acid to leave a material with high surface area and to replace the cations with protons. After curing this material had a low BET surface area of 0.24 m$^2$/g, but after H$_2$SO$_4$ extraction and drying under vacuum it increased to 26 m$^2$/g. In contrast, the material of Example A2, after curing to 250 C did not increase in BET surface area upon aqueous HCl extraction. The cured material of Example A1 was already porous with a BET surface area of 16 m$^2$/g which increased to 23 m$^2$/g upon HCl extraction and reheating.

Figure 4:
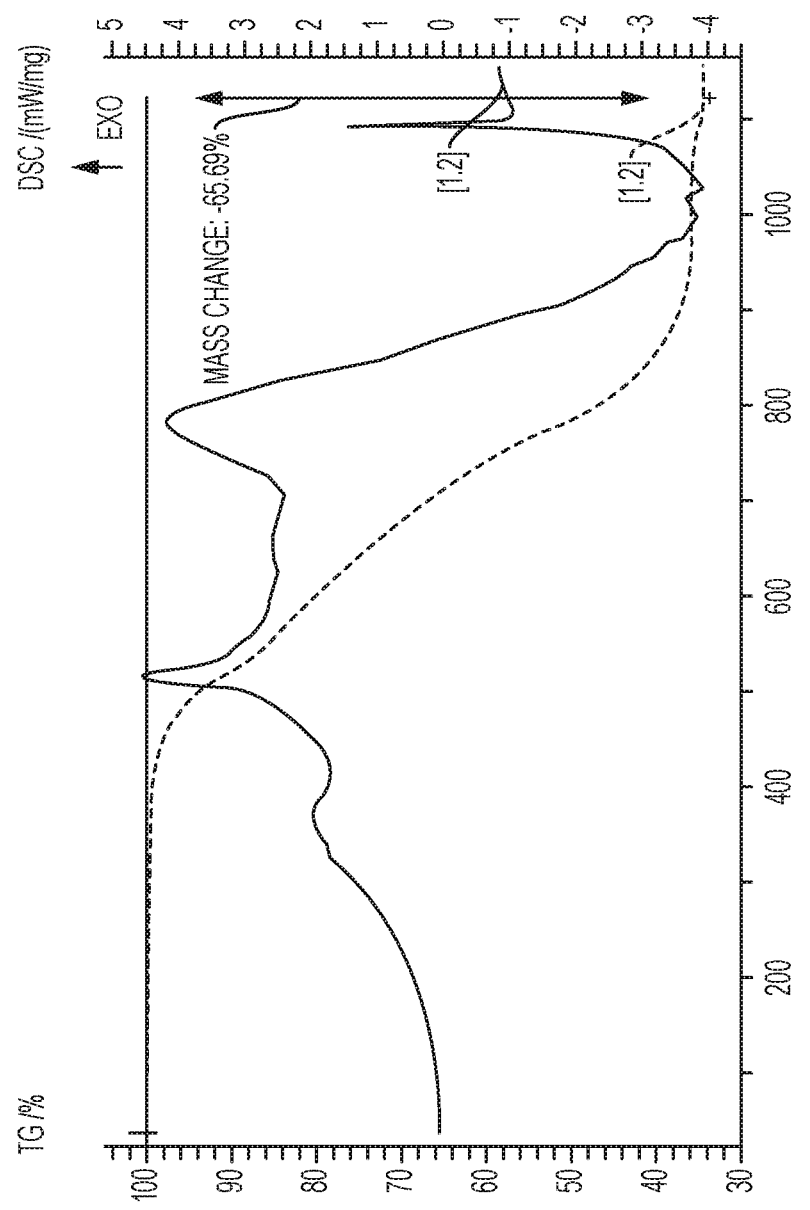
FIG. 4 shows results of thermogravimetric analysis (TGA) was conducted on material #3 after being heated to 250° C. in dry box.

Thermogravimetric analysis (TGA) was conducted on material #3 after being heated to 250° C. in dry box, with results shown in FIG. 4. Under O$_2$ it left behind a colorless residue.

Figure 5:
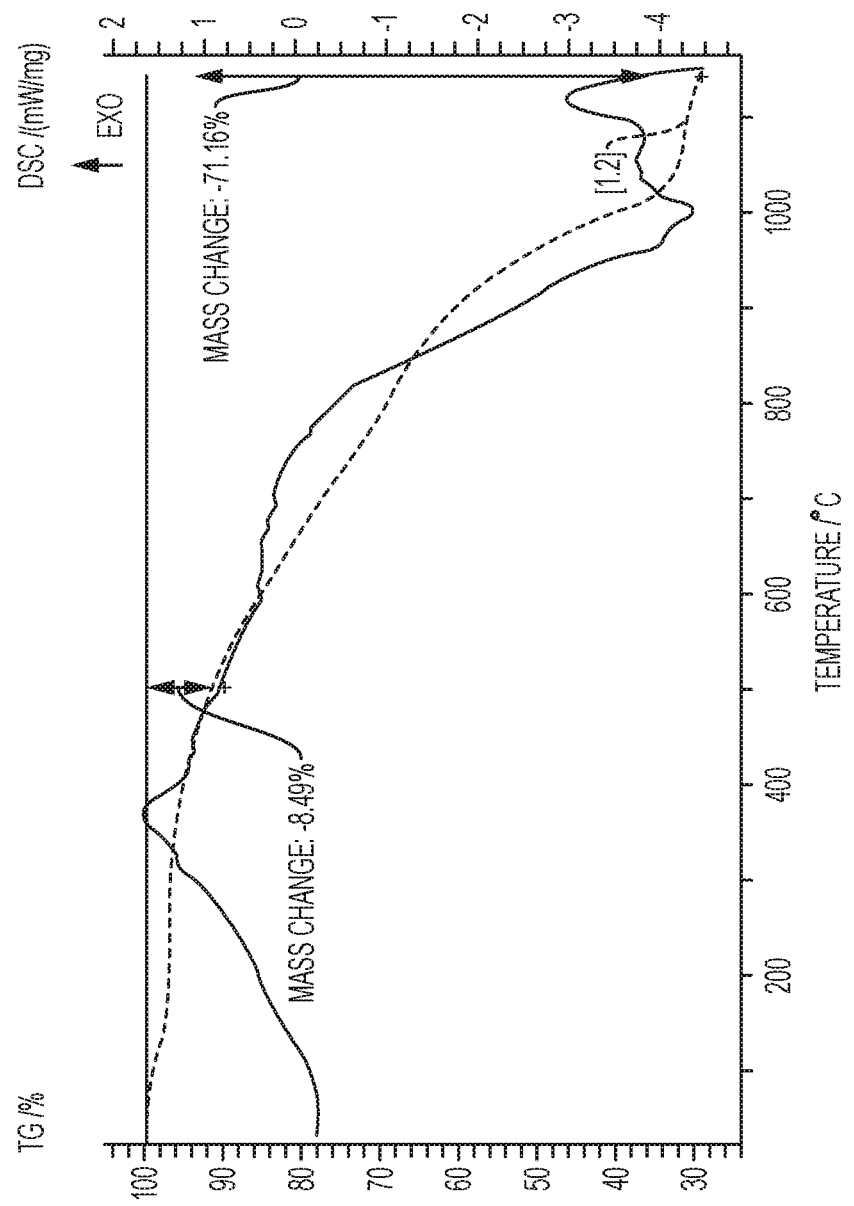
FIG. 5 shows TGA results of material #3 after being exposed to air for a day and run under argon.

When material from reaction #3 was air exposed for a day and run under argon, it lost mass at lower temperatures, as shown in FIG. 5.

Figure 6:
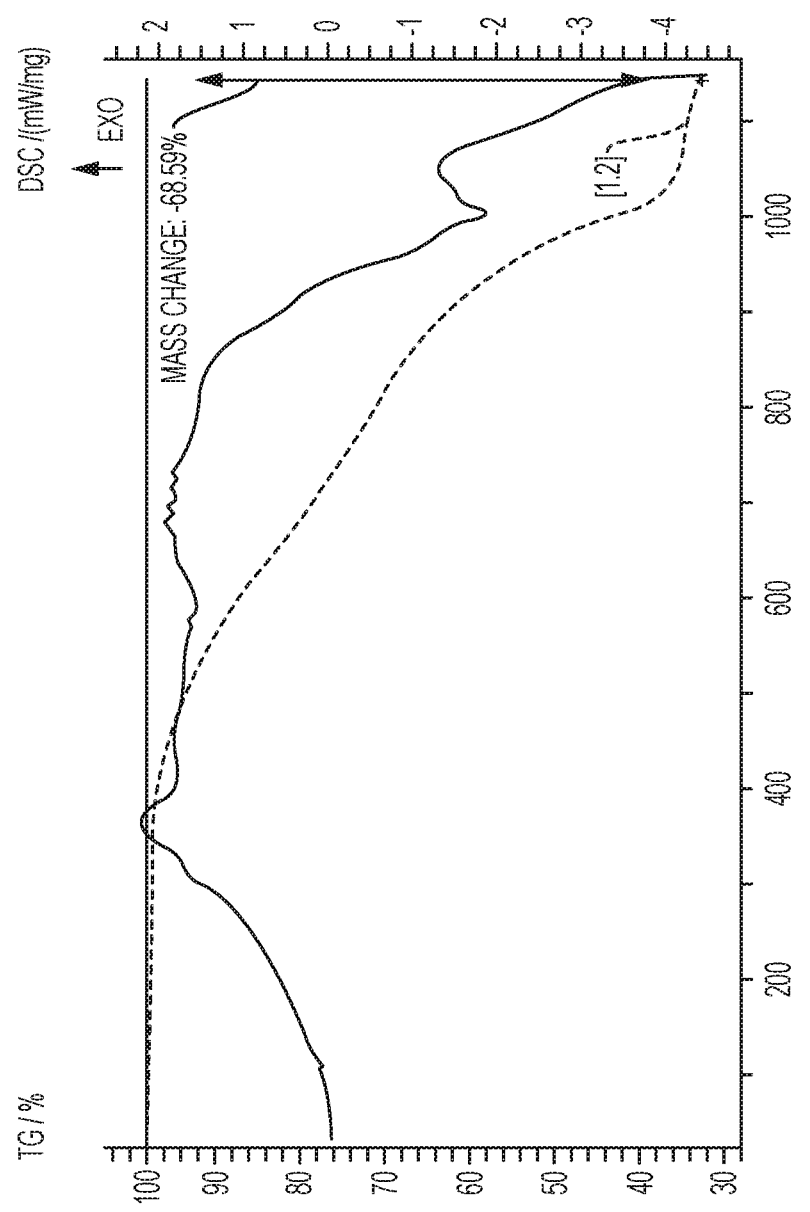
FIG. 6 shows TGA results of material #3 exposed to air briefly, but was inserted into a 150° C. carrier.

When exposed to air briefly, but was inserted into a 150° C. carrier, it didn't lose mass until about 500° C., as shown in FIG. 6.

Figure 7A:
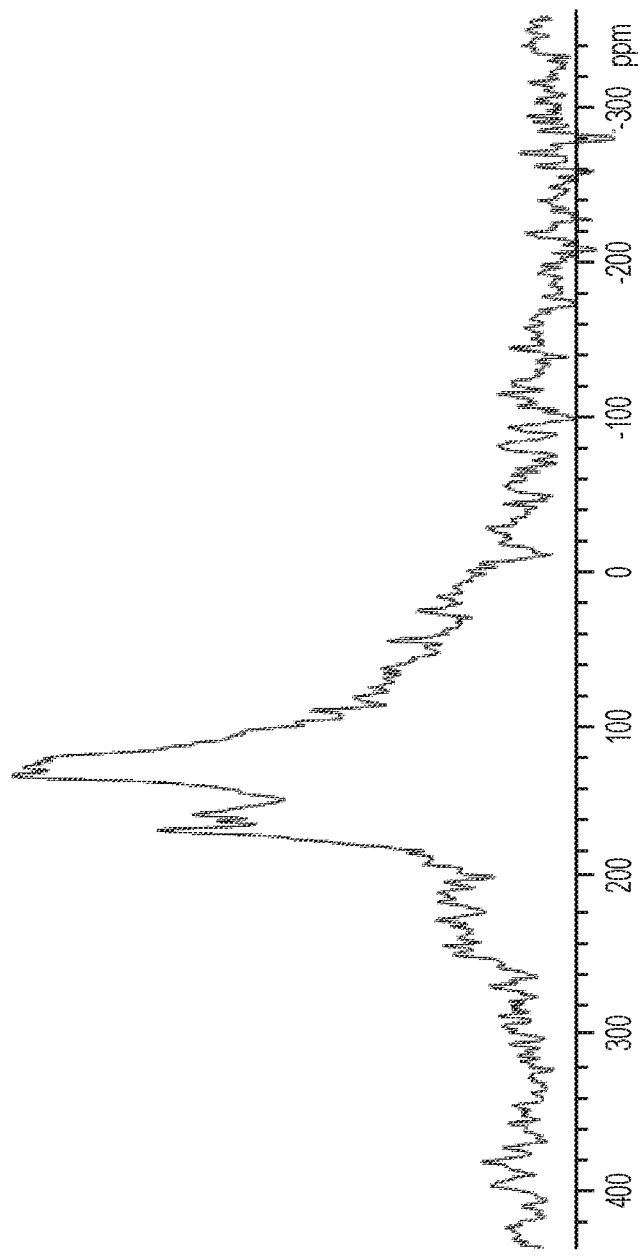
FIGS. 7A, 7B, and 7C are solid state NMR spectra from material #3 that was run under MAS (magic angle spinning) conditions.
Figure 7B:
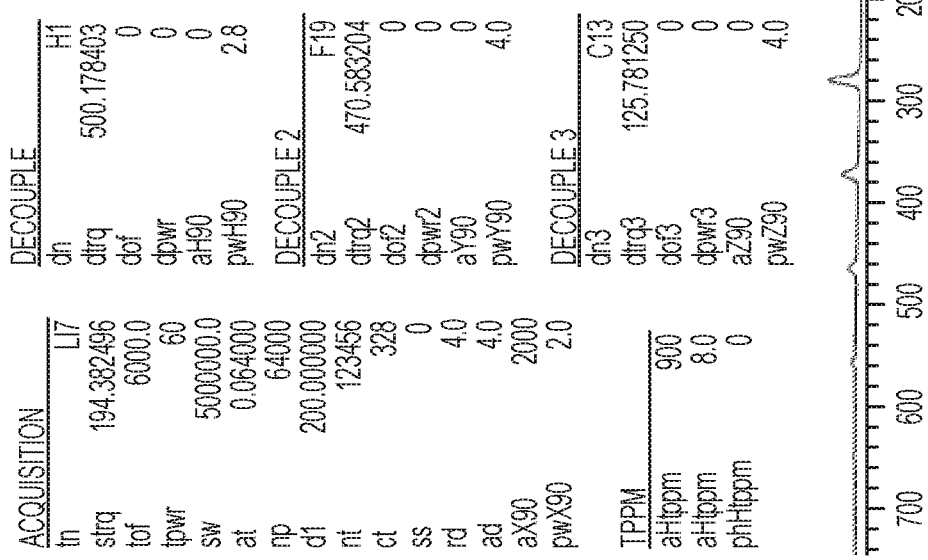
Figure 7C:
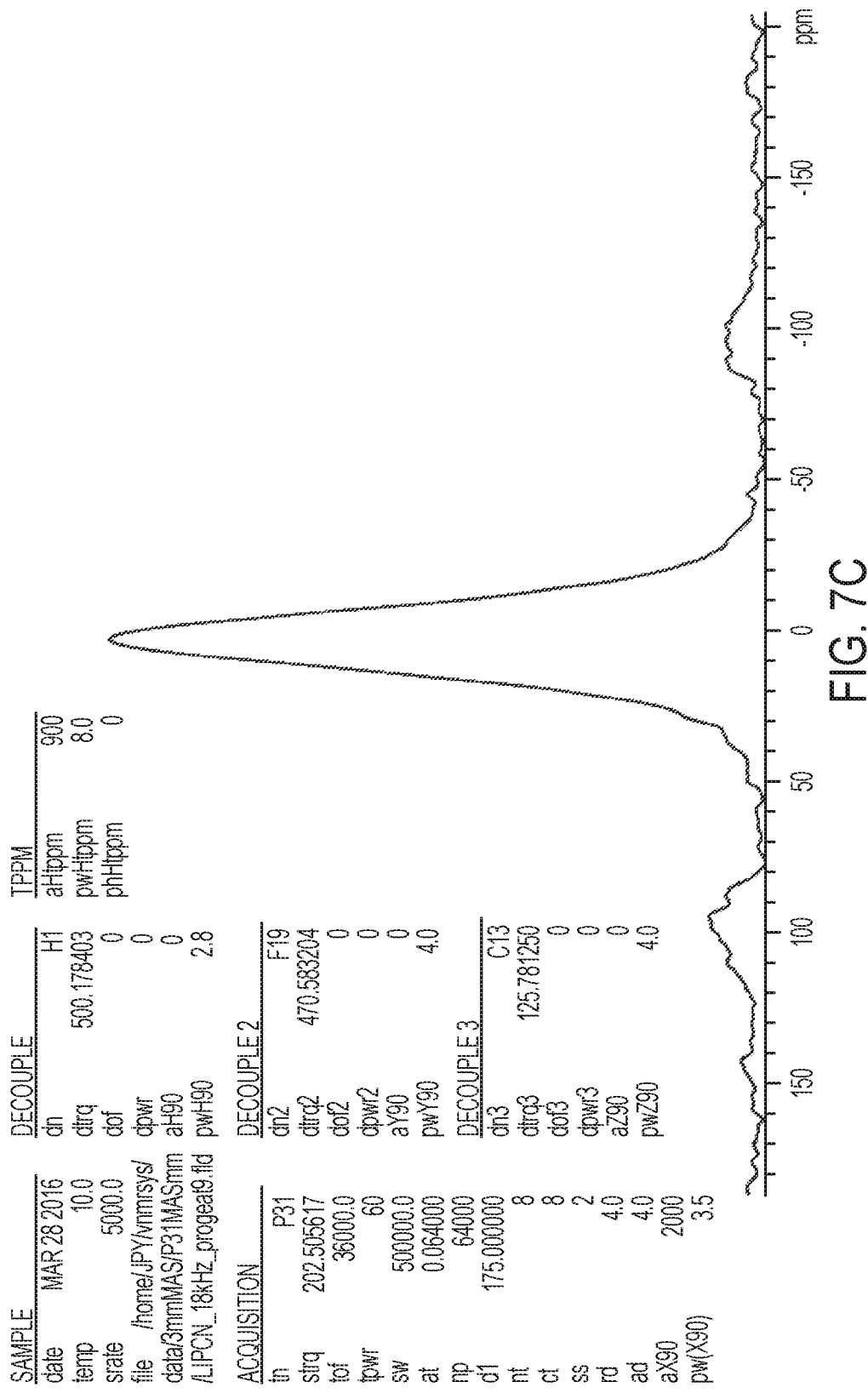

FIGS. 7A-7C show solid state NMR results from reaction #3 material that was run under MAS (magic angle spinning) conditions. The Li-7 spectrum shows the Li to be ionic, the Phosphorus has one peak near 0 ppm, very similar to the hump in the solution spectra above, and the C-13 is the most informative, as it shows a large peak around 120 ppm indicating free CEN groups, and smaller peaks around 160-180 ppm, characteristic of trimerized or polymerized cyano groups.

Advantages

The process described herein, involving the reaction of lithium dicyanamide (LiN(CN)$_2$) and phosphorus tricyanide (P(CN)$_3$), has the advantage of producing a soluble prepolymer material that can be included in a paint-like solution or slurry. This can then be used as an "ink" or "paint" to deposit this material via a variety of processes, producing films, printing patterns, or even printing 3D structures. This opens the possibility of variation in composition and properties for various embodiments starting from this fairly general procedure of making a lithiated carbon phosphonitride prepolymer. One would expect that the dicyanamides of other alkali metals such as Na, K, Rb, and Cs would behave similarly in the presence of a suitable mutual solvent and reaction conditions that must be determined through trial and error.

Alternatives

It is expected that other polar aprotic solvents could be used, for example dimethoxyethane, pyridine, quinolone, and acetonitrile, as well as possibly diphenyl ether, dichloromethane, ethyl acetate, dimethylformamide, dimethylacetamide, N-methyl pyrrolidone, propylene carbonate, ethylene carbonate, dimethylcarbonate, diethylcarbonate, 1,2,3-trimethoxypropane, morpholine, nitrobenzene, nitromethane, acetic anhydride, pyran and derivatives, sulfolane, pyrrolidine, tetramethylurea, dimethyl sulfoxide, acetone, cyclic ethers, and/or hexamethylphosphoric triamide. Combinations of solvents might be used. Tetrahydrofuran (THF) is an excellent solvent for the reactants and does not react with P(CN)$_3$, but was observed to be catalytically polymerized by the red decomposition products of P(CN)$_3$ [ref 2], and it is not clear whether or not this process occurs during the reaction with dicyanamide. Ionic liquid dicyanamides react with P(CN)$_3$ in the absence of any other solvent to form a dark red polymerized material, and may be used as reactive solvents with other dicyanamides that are soluble in these ionic liquids.

P(CN)$_3$ reacts with dicyanamides generally, as long as there is some solubility in the reaction medium. Other reactants that we have also observed to polymerize P(CN)$_3$ include azide salts (for example, lithium azide), carbonate salts, and a variety of other salts. Preferably, the salt employed is soluble in the reaction medium. Combinations of two or more salts can be used. Reactants can be used to incorporate gas-generating moieties into material and/or to introduce a variety of different size cations in the material. The reaction proceeds relatively slowly in MeCN, but works relatively well in dimethoxyethane (also termed DME or glyme). The products precipitate from glyme, forming two layers (which may be advantageous, as that might limit the molecular weight of the product). When carried out in pyridine, the entire reaction stays soluble for several days.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. Schmidpeter, A.; Zwaschka, F. *Z. Chem.* 1984, 24(10), 376.
2. Siesler, H. W; Tittle, B. *Polymer,* 1975, 16, 548.

What is claimed is:

1. A material comprising a polymer of lithiated carbon phosphonitride and consisting essentially of Li, C, P, and N.
2. The material of claim 1, having a conductivity of $10^{-3}$ S cm$^{-1}$ at 90° C.
3. The material of claim 1, in a condition of having been made by reacting $P(CN)_3$ with $LiN(CN)_2$ in solution, then drying the solution to obtain the material.

* * * * *